Figure 1:
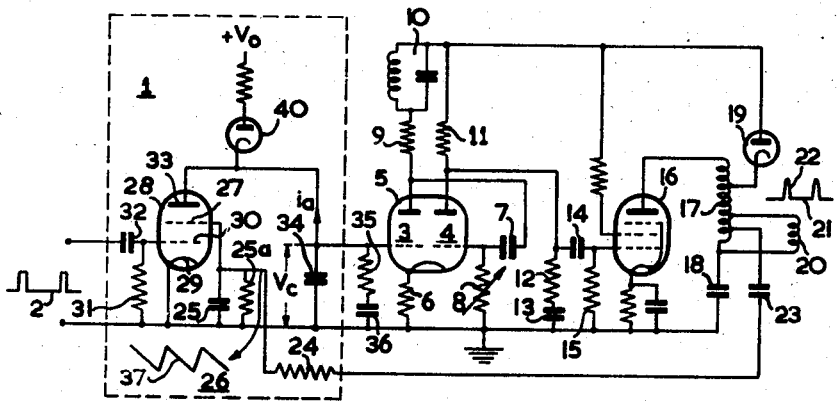

Oct. 6, 1959    P. J. H. JANSSEN ET AL    2,907,880
CIRCUIT-ARRANGEMENT FOR MEASURING VOLTAGES
Filed March 21, 1956

INVENTOR
PETER JOHANNES HUBERTUS JANSSEN
WOUTER SMEULERS
BY
*Fred M. Vogel*
AGENT United States Patent Office 2,907,880
Patented Oct. 6, 1959

2,907,880

CIRCUIT-ARRANGEMENT FOR MEASURING VOLTAGES

Peter Johannes Hubertus Janssen and Wouter Smeulers, Eindhoven, Netherlands, assignors, by mesne assignments, to North American Philips Company, Inc., New York, N.Y., a corporation of Delaware Application March 21, 1956, Serial No. 573,050

Claims priority, application Netherlands April 14, 1955

6 Claims. (Cl. 250—27)

In many fields of weak current engineering there is a need for circuit-arrangement for measuring voltages and more particularly a need for circuit-arrangements intended for measuring potential variations, with which it may be desirable to perform the measurement either continuously or discontinuously, hence only at particular instants. The latter is, for example, the case in telephone transmission systems employing pulse coded modulation, the amplitude of the telephone signal to be transmitted being determined periodically and the measuring result subsequently being transmitted in a particular code. In radio and television reception, automatic gain control arrangements are widely used, in which a control voltage is generated, which is proportional to the amplitude of the incoming signal. In this case, particularly in television reception, the control voltage may be produced by measuring the amplitude of the incoming signal at periodic instants, that is to say during synchronisation pulses or black level. Such periodic determination of the amplitude of a voltage is, for example, also employed in AFC control arrangements, in which an oscillator signal is to be synchronised with a control voltage pulse.

In conventional circuit-arrangements for measuring the amplitude of a voltage periodically, the measuring result is often obtained in the form of a capacitor charge. After performing a measurement, the capacitor charge will frequently change due to the presence of a direct current passing circuit, for example a resistor, connected in parallel with the capacitor. In general, said capacitor charge variations are not serious if the circuit arrangement is correctly proportioned. Serious is, however, the variation of the capacitor's charging condition which occurs if, after performing a particular measurement of the required series, a number of next measurements do not take place. For this reason usually symmetrical phase-comparison stages are employed in the AFC circuit arrangement, for example in television receivers, for synchronising the horizontal time base. These stages have the advantage that they are adjustable in such manner that in the case of equality of the repetition frequency of incoming synchronisation pulses and of the natural frequency of the time base generator the control voltage produced is exactly zero.

If in this case, the synchronisation pulses are failing due to interference, the control voltage does not change. However, this merit of conventional symmetrical phase-comparison stages is of little importance in practice since, in general, there is no equality of said frequencies, so that a control voltage does occur at the output of the phase-comparison stage.

If the synchronisation pulses then fail, the capacitor, across which the regulating voltage occurs, is discharged or charged by way of a usually parallel-connected direct current circuit. This manifests itself by jagged lateral sides of the picture on the screen of the picture tube of television receivers.

The present invention has for its object to provide a circuit-arrangement for modifying, within a first potential range, the voltage across a capacitor in accordance with those variations of a second voltage, which occur within a second potential range, in such manner that, in the case of discontinuous voltage measurement, the capacitor voltage does not practically change during the time elapsing between two measurements.

The circuit-arrangement in accordance with the invention has the feature that the capacitor is connected between an output electrode capable of emitting secondary electrons and the cathode circuit of a tube, and the second voltage is applied to a control electrode of the tube, which control electrode regulates the secondary emission of said output electrode, and that with regard to voltages within said two voltage ranges a connecting circuit passing only alternating current is provided between the output electrode and the cathode circuit of the tube, whilst the tube with respect to voltages within said voltage intervals, is set to operate in that part of a dynatron characteristic curve, in which the current to the output electrode, upon an increase in voltage on this output electrode from the lowest value of the first-mentioned voltage interval to the highest value of this voltage interval and at a constant voltage on the control electrode, increases substantially linearly from a negative to a positive value.

Figure 2:
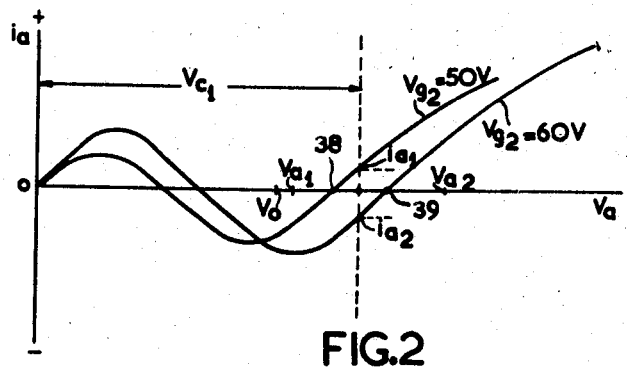
Figures 3, 4:
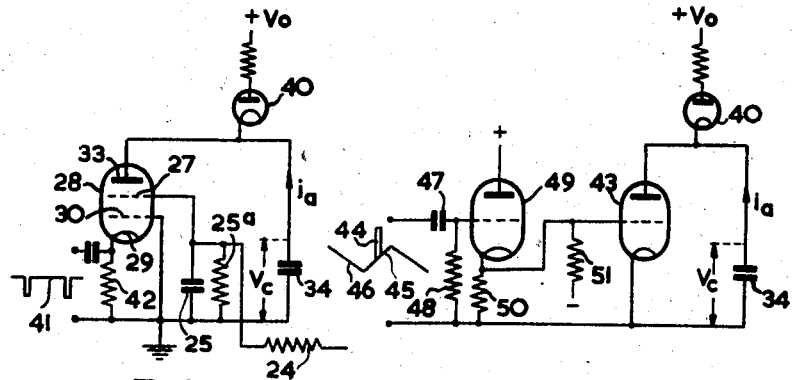

In order that the invention may be readily carried into effect, a number of examples will now be described in detail with reference to the accompanying drawing, in which:

Fig. 1 shows the use of one form of the circuit in accordance with the invention in an AFC arrangement for the line time base of a television receiver, Fig. 2 shows a number of characteric curves of the tube employed in the circuit-arrangement shown in Fig. 1, and Figs. 3 and 4 show two modified forms of the circuit-arrangement in accordance with the invention.

In the circuit shown in Fig. 1, an arrangement 1 which comprises one form of the circuit in accordance with the invention, is employed for generating an AFC control voltage for synchronising a line time base by means of synchronisation pulses 2. The line time base shown in the drawing is of a common type and, while it is only of secondary importance for making the invention well understood its operation will be described only briefly. It comprises an oscillator of the multivibrator type with two triode systems 3 and 4 incorporated to one tube 5 the common cathode lead of the two systems comprising a cathode resistor 6. The anode of the triode portion 3 is coupled, through an RC network 7, 8 the resistor 8 of which is variable in order to control the natural frequency of the multivibrator, to the control grid of the triode portion 4. The anode circuit of the anode 3 comprises the series-combination of a resistor 9 and an LC circuit, 10, the latter serving to increase the frequency stability of the multivibrator. The anode circuit of the triode 4 comprises a resistor 11. The voltage set up across this resistor is supplied to the series-combination of a resistor 12 and a capacitor 13. The saw-tooth voltage across said series-combination is applied by way of the RC network 14, 15 to the control grid of the tube 16, the anode circuit of which comprises the series-combination of a transformer winding 17 and a capacitor 18. Connected to a first tapping of the transformer winding 17 is the cathode of a damping diode 19, a line deflection coil 20 being connected in parallel with part of the transformer winding 17. The operation of this deflection arrangement is known. Furthermore it is known that across the transformer winding 17 there occurs a voltage impulse of the form 21, the positive-going pulses 22 of which coincide with the occurrence of the fly-back of the saw-tooth current through the deflection coil 20. Moreover, it is known to derive from said voltage impulse 22 a saw-tooth voltage which is phase-compared with the incoming synchronisation pulses 2 in a phase-comparison stage in order to produce an AFC control voltage for the multivibrator. For this purpose part of the voltage impulse 22 is derived via a capacitor 23 from a second tapping of a transformer winding 17 and supplied to an integrating network comprising a resistor 24 and a capacitor 25.

Across the capacitor 25 is produced a saw-tooth voltage of the form indicated at 26, the voltage of which decreases during the rise of the saw-tooth deflection current and increases during the fly-back. The voltage 26 across the capacitor 25 is applied to a second control grid 27 of a tube 28, which is a tetrode and the cathode 29 of which is grounded. In parallel with the capacitor 25 is connected a resistor 25a for carrying off the screen-grid current flowing through the screen grid 27. The positive-going impulses 2 are applied to a first control grid 30 through an RC network 31, 32. The time constant of this RC network is so chosen as to produce peak-detection of the pulses 2 in known manner so that, during a pulse, the potential of the control grid 30 is practically equal to earth potential and current is unable to flow in the tube 28 during the time elapsing between two pulses. The anode 33 of the tube 28 is capable of emitting secondary electrons, the secondary emission being controlled by the potential of the second control grid 27. A capacitor 34 is connected between the anode 33 and the cathode 29. The voltage $V_c$ across the capacitor 34 acts as an AFC control voltage for the multivibrator and is applied to the control grid of the multivibrator's triode 3. In parallel with the capacitor 34 is connected the series-combination of a resistor 35 and a capacitor 36, these three elements jointly constituting in known manner a filter in order to enhance the stability and freedom from interference of the frequency control.

To explain the operation of the arrangement 1 we shall first consider the variation of the anode current $i_a$ of the tube 28 as a function of the anode voltage $V_a$ and the voltage $V_{g2}$ on the second control grid 27, as shown in Fig. 2. From Fig. 2 it is seen that the anode current $i_a$, at a given value of the voltage $V_{g2}$ on the second control grid, say 60 volts, with an increase in anode voltage $V_a$ from zero onwards first goes positive from zero onwards, subsequently decreases, becomes zero, next goes negative and, upon attaining a minimum at approximately $V_{a1}$ volt anode potential, becomes less negative and with an increase in anode voltage, again becomes positive. Such a dynatron characteristic is likewise obtained at a different voltage $V_{g2}$, of, say 50 volts upon limitation, as indicated in Fig. 2 for the sake of simplicity, to voltages $V_{g2}$ between 50 and 60 volts on the second control grid it is found that for anode voltages between $V_{a1}$ and $V_{a2}$, the anode current $i_a$ at a given value of the voltage $V_{g2}$ and with an increase in anode voltage from the value $V_{a1}$ to the value $V_{a2}$ increases substantially linearly from a negative to a positive value. It is to be noted that the anode potential interval $V_{a1}$ to $V_{a2}$ and the screen grid potential interval, which here varies from 50 to 60 volts, within which interval said linear variation of the anode current occurs, depends upon the type of tube used, and that the invention is not limited to the use of variations of $V_{g2}$ between 50 and 60 volts, as has been assumed for the sake of simplicity.

Reverting to the circuit-arrangement shown in Fig. 1 provision has consequently to be made that at the instant at which the phases of the potentials 2 and 26 are to be compared, hence at the instants at which the positive-going synchronisation pulses 2 occur, the voltage 26 has a value between 50 and 60 volts.

Since the frequency of the multivibrator, in the circuit-arrangement shown in Fig. 1, increases with a decrease in control voltage it is necessary in this case, as will be seen later, to use the rising flank 37 of the saw-tooth voltage 26 for phase-comparison. That part of said flank 37 which is employed for phase-comparison should then lie in the potential interval of 50 to 60 volts.

Assuming at a given instant, the voltage $V_c$ across the capacitor 34, which is the anode potential of the tube 28, to be equal to the voltage $V_{c1}$ indicated in Fig. 2 and subsequently, at the instant at which the tube 28 is released by an incoming synchronisation pulse 2, the momentary amplitude of the flank 37 of the saw-tooth voltage 26 to reach a value of 50 volts. This causes a positive anode current $i_{a1}$ to flow with the result that the capacitor 34 is discharged until the voltage $V_c$ across said capacitor drops to such a point as to reach the zero-cross-over 38. If, on the other hand, the momentary amplitude of the flank 37 would have been equal to 60 volts at the instant of releasing the tube 28, a negative anode current having an initial value $i_{a2}$ would have flown at said instant to the effect of charging the capacitor 34 till reaching the zero cross-over 39.

Consequently, the control voltage $V_c$ across the capacitor 34 each time corresponds to the zero cross-over of that $i_a$—$V_a$ characteristic curve associated with the screen-grid voltage set up at the instant at which the electron current in the tube is released by the synchronisation pulses 2.

If, in the aforesaid circuit arrangement, the frequency of the multivibrator decreases for some reason the flank 37 of the voltage 26 occurs later with respect to the synchronisation pulses 2 so that the screen grid voltage $V_{g2}$ will be lower than before, hence the voltage $V_c$ will be reduced. This reduction of the control voltage involves an increase in frequency of the multivibrator, hence the initial variation is counteracted.

Should the synchronisation pulses 2 fail to appear for some time in the aforesaid circuit-arrangement, the capacitor 34 retains its charge, since there is no direct current path over which a discharge could occur. In the embodiment shown in the drawing, the capacitor 32 will consequently loose its negative charge after some time, so that the tube again becomes conductive. If this is deemed objectionable a sufficient negative bias may be applied to the control grid via the resistor 31.

It is to be noted, that, in order to make the circuit-arrangement operative, an anode voltage should be applied to the tube 28. Therefore, the anode 33 of the tube 28 is connected to the cathode of a diode 40, the anode of which is connected to a point of positive potential $V_0$. This voltage $V_0$ is made lower than the lowest value $V_{a1}$ of the anode voltage interval $V_{a1}$—$V_{a2}$ during which the arrangement is used, so that during operation of the circuit-arrangement the voltage $V_c$ exceeds the voltage $V_0$ and the diode 40 is cut off.

Furthermore it is essential that the voltage on the screen grid should be delivered by a supply of a sufficiently low internal resistance lest the screen-grid current and the secondary-emission current from the anode adversely affect the amplitude of the supplied screen-grid voltage when the tube is conductive.

Fig. 3 shows a modified form of the arrangement represented in Fig. 1, in which corresponding parts are indicated by the same references, except that, in the circuit-arrangement shown in Fig. 3, contrary to the circuit-arrangement depicted in Fig. 1, the synchronisation pulses are not applied to the control grid of the tube but these pulses 41 are now supplied in negative direction to the resistor 42 included at the cathode lead, and the control grid 30 is connected to the lower end of this resistor.

Fig. 4 shows a further form of the circuit-arrangement in accordance with the invention, which comprises a triode 43.

Upon correct adjustment of the anode voltage and grid voltage of a triode the characteristic curves correspond, as is known, to those shown in Fig. 2, but here the influence of the parameter $V_{g2}$ of the tetrode is replaced by the control-grid voltage $V_{g1}$.

In order that, in the case of a triode, periodic measurement of the momentary amplitude of a test voltage be feasible, the synchronisation impulse of constant amplitude is added to said test voltage, so that the output voltage $V_c$ is a measure of the sum of a constant amplitude and the amplitude to be measured, hence of the variations of the amplitude to be measured. In the circuit-arrangement shown in Fig. 4, this sum of voltages, in the present case a synchronisation impulse 44 of constant amplitude superposed on the flank 45 of the saw-tooth voltage 46, is applied to the control grid of a triode 49 via an RC network 47, 48. The voltage across the cathode resistor 50 included in the cathode lead 49 is applied to the control grid of the tube 43. To this control grid is moreover applied a negative bias via a resistor 51, which bias is so chosen that the triode 43 becomes conductive only during the occurrence of the synchronisation impulse 44, the amplitude of said impulse being chosen to be such that the control grid potential is brought into the desired area of the dynatron characteristic curve of the tube 43.

It has so far been assumed that the voltage $V_c$ across the capacitor 34 is employed as a control voltage for an AFC circuit. This voltage $V_c$ changes substantially in accordance with the variations of the applied saw-tooth voltage 26, 46 when the amplitude is being measured. Hence, it will be appreciated that the same circuit arrangement in accordance with the invention is also suited to other uses such as, for example, production of a control voltage for automatic amplification control or periodic measurement of the amplitude of a telephone signal such as is the case in pulse coded modulation systems. Alternatively, the circuit-arrangement in accordance with the invention may be employed for continuous measurement of variations of a voltage supplied.

What is claimed is:

1. A circuit for varying the value of an output voltage across a capacitor within a first voltage range in accordance with variations of an input voltage which varies within a second voltage range, comprising an electron discharge tube having a cathode, an output electrode capable of emitting secondary electrons, and a control electrode for regulating the secondary emission of said output electrode, means connecting said capacitor directly between said output electrode and said cathode, means connected to apply said input voltage to said control electrode, and output means connected across said capacitor for deriving said output voltage therefrom, said tube having a dynatron characteristic curve of anode current versus anode voltage and being biased so that said characteristic curve is linear within the limits of said first voltage range.

2. A circuit as claimed in claim 1, including a rectifier having a cathode connected to said output electrode and having an anode, and a source of voltage connected to said anode and having a value of voltage which is less positive than the least positive value of voltage across said capacitor within said first voltage range.

3. A circuit as claimed in claim 1, in which said tube is a tetrode having a control grid in addition to said control electrode, and including a source of pulses connected to said control grid to render said tube periodically conductive, whereby the voltage across said capacitor is a measure of the periodic amplitude of said input voltage.

4. A circuit as claimed in claim 1, in which said tube is a tetrode having a control grid in addition to said control electrode, and including means connected to bias said control grid at a fixed potential and a source of pulses connected to said cathode to render said tube periodically conductive, whereby the voltage across said capacitor is a meausre of the periodic amplitude of said input voltage.

5. A circuit as claimed in claim 1, in which said tube is a triode, and including a source of pulses and means to apply said pulses to said control electrode along with said input voltage, and means connected to bias said control electrode so that said tube is rendered periodically conductive upon the occurrences of said pulses, whereby the voltage across said capacitor is a measure of the periodic amplitude of said input voltage.

6. A phase comparison circuit comprising an electron discharge tube having a cathode, an output electrode capable of emitting secondary electrons, and one or more control electrodes for regulating the secondary emission of said output electrode, a capacitor connected directly between said output electrode and said cathode, a source of pulses connected to one of said control electrodes, a source of sawtooth voltage connected to one of said control electrodes, and output means connected across said capacitor to derive therefrom a phase-comparison voltage developed therein, said tube having a dynatron characteristic curve of anode current versus anode voltage and being biased so that said characteristic curve is linear within the amplitude range of said phase-comparison voltage.

References Cited in the file of this patent

UNITED STATES PATENTS

| | | |
|---|---|---|
| 2,070,312 | Philpott | Feb. 9, 1937 |
| 2,141,343 | Campbell | Dec. 27, 1938 |
| 2,145,356 | Jonker et al. | Jan. 31, 1939 |
| 2,389,004 | Schroeder | Nov. 13, 1945 |
| 2,537,807 | Anderson | Jan. 9, 1951 |
| 2,579,627 | Tourshou | Dec. 25, 1951 |
| 2,670,110 | Janssen | Aug. 21, 1956 |